(12) United States Patent
Wang et al.

(10) Patent No.: US 7,983,135 B2
(45) Date of Patent: Jul. 19, 2011

(54) OPTICAL SYSTEM WITH SUPERLENS

(75) Inventors: Shih-Yuan Wang, Palo Alto, CA (US); R. Stanley Williams, Portola Valley, CA (US)

(73) Assignee: Hewlett-Packard Development Company, L.P., Houston, TX (US)

(*) Notice: Subject to any disclaimer, the term of this patent is extended or adjusted under 35 U.S.C. 154(b) by 469 days.

(21) Appl. No.: 12/253,136

(22) Filed: Oct. 16, 2008

(65) Prior Publication Data

US 2009/0109828 A1    Apr. 30, 2009

Related U.S. Application Data

(60) Provisional application No. 60/983,833, filed on Oct. 30, 2007.

(51) Int. Cl.
*G11B 7/00* (2006.01)
(52) U.S. Cl. .............................. 369/112.23; 369/112.01

(58) Field of Classification Search ............. 369/112.01, 369/112.23, 13.32, 13.33, 94; 359/719
See application file for complete search history.

(56) References Cited

U.S. PATENT DOCUMENTS

| | | | |
|---|---|---|---|
| 2003/0048700 A1* | 3/2003 | Fujimoto | 369/13.38 |
| 2003/0227415 A1* | 12/2003 | Joannopoulos et al. | 343/754 |
| 2005/0128931 A1* | 6/2005 | Kim et al. | 369/275.4 |
| 2007/0159617 A1* | 7/2007 | Mackey | 355/80 |
| 2007/0268600 A1* | 11/2007 | Tsukagoshi | 359/754 |

* cited by examiner

*Primary Examiner* — Thang V Tran (57) ABSTRACT

An optical system includes an optical recording medium configured to store data and a light device configured to emit a beam of light to write the data to the optical recording medium or read the data from the optical recording medium. The optical system also includes a superlens positioned between the optical recording medium and the light device. The superlens is configured to focus the beam of light emitted from the light device to create a focused beam of light on the optical recording medium.

21 Claims, 6 Drawing Sheets

OPTICAL SYSTEM WITH SUPERLENS

CROSS-REFERENCE TO RELATED APPLICATION

The present application claims priority from provisional application Ser. No. 60/983,833, filed Oct. 30, 2007, the contents of which are incorporated herein by reference in their entirety.

STATEMENT REGARDING FEDERALLY SPONSORED RESEARCH OR DEVELOPMENT

This invention was made in the course of research partially supported by Defense Advanced Research Projects Agency, Contract No. HR0011-05-3-0002. The U.S. government has certain rights in the invention.

BACKGROUND

Current optical storage devices use a light device to emit a light beam, such as a laser, to write data to and read data from optical recording media. Optical recording media include digital video discs (DVDs) and compact discs (CDs). To write data onto a disc, optical storage devices use the light beam to make a series of microscopic "marks" in a layer of the disc. The resulting sequence of light and dark marks (called "pits" and "lands") represent the digital ones and zeros that comprise data. In rewritable optical storage devices, the light device creates "marks" by changing the reflective properties of a layer of the optical recording media. For example, the light beam produced by the light device may alter a portion of a phase-change alloy layer of the optical recording media from amorphous to crystalline, and vice versa. To read a disc, light is reflected off of the marks in the recording media back to the light device and read as information. The light device of rewriteable optical storage devices often includes two light emitting sources to produce two different light beams. One light beam is used to write data to the disc, while another less powerful light beam is used to read data from the disc.

Optical storage devices generally use a motor to spin discs to a certain number of revolutions per minute (RPM). The light device is affixed to floating head above the optical recording media. As the disc spins, the light beam is moved along the disc on the floating head and starts writing from the inner portion of the disc to the outside. Similarly, a light beam on the floating head moves across the disc to read data from the disc.

One drawback of conventional optical storage devices is that the amount of data that can be written to or read from an optical recording medium is limited by the size of the light beam emitted from the light device. This is because optical recording media have a finite amount of surface area over which marks can be formed. Therefore, it is desirable to make very thin marks to fit as many marks as possible on a disc. The width of the marks formed in the disc is governed by the diameter of the light beam. The diameter of the light beam is often referred to as "resolution." The smaller the diameter of the light beam or the greater the resolution, the more marks can be fit onto the optical disc. Thus, more data can be packed onto the disc with the use of a more focused light beam having a narrow diameter or greater resolution.

However, the light devices used in conventional storage devices have a maximum resolution on the order of one wavelength due to the diffraction limit of light. That is, the diameter of the light beam can only be as small as the wavelength of the light used in the light beam. The diffraction limit is a fundamental maximum of the resolution of any optical system which is due to the diffraction of light. For example, a blue light beam of 470 nanometers (nm) can only have a resolution of 470 nm. As such, the amount of data that can be placed on optical recording media by conventional storage devices is inherently limited.

Moreover, the light beams produced by conventional storage devices must be placed in very close physical proximity to the optical recording media, in order to limit diffraction of the light beam. This close physical proximity of the light device to the recording media creates very low manufacturing tolerances. The precision with which conventional storage devices must be manufactured increases the costs of the devices.

BRIEF DESCRIPTION OF THE DRAWINGS

Features of the present invention will become apparent to those skilled in the art from the following description with reference to the figures, in which.

DETAILED DESCRIPTION

For simplicity and illustrative purposes, the present invention is described by referring mainly to embodiments. In the following description, numerous specific details are set forth in order to provide a thorough understanding of the embodiments. It will be apparent however, to one of ordinary skill in the art, that the embodiments may be practiced without limitation to these specific details. In other instances, well known methods and structures have not been described in detail so as not to unnecessarily obscure the description of the embodiments.

Embodiments of optical systems and methods for writing data to and reading data from optical storage media are disclosed herein. The optical systems include an optical recording medium configured to store data. The optical recording medium may be any conventional device having the capability to store data. For instance, the optical recording medium may include CDs, DVDs, optical hard drives, etc.

The optical systems include a light device, which is configured to produce a narrow beam of light. For instance, the light device may include a laser, a tapered fiber, a near-field scanning optical microscope (NSOM), a quantum dot, etc. The beam of light produced by the light device is passed through a superlens before it contacts the optical storage media to read data from or store data to the optical storage medium. For example, the light beam produced by the light device may make marks in the optical recording medium to write data thereto. The term "marks," as used herein refers to any alterations made to a surface of the optical recording medium to modify the reflective properties of the optical recording medium. The marks may be physical depressions or pits in the optical recording medium or may be chemical changes to a surface of the optical recording medium, as is known in the art. Alternatively, or in addition thereto, the light beam may reflect off of the recording media to allow data to be read from the optical recording media. The same light beam may both read data from and write data to the optical recording media. Alternatively, a more powerful light beam may be used to write data to the optical storage media, while a second less powerful light beam may be used to read data therefrom.

As mentioned above, the light beam emitted by the light device is passed through a superlens before the light beam contacts the optical recording medium. The superlens is a device which refracts and focuses light to subwavelength proportions to reduce the size of the resulting spot on the recording medium. The term "spot" refers to the dot of light that contacts the recording medium and creates the marks in the recording medium to represent data. The spot may also be reflected off of the marks in the recording medium to read data. For example, the superlens may focus the light beam produced by the light device to create a spot size of ½ lambda ($\lambda$), or ½ the wavelength of the light used to create the light beam. For example, the light beam may be a near ultraviolet light of about 380 nm. The superlens may increase the resolution of the light beam to create a spot size equal to or less than about 190 nm. Spot size refers to resolution or the diameter of the spot on the recording medium. In one embodiment, the spot size may be reduced to 30 nm or less in diameter or $\frac{1}{12}\lambda$. In another embodiment, the spot sized may be reduced to $\frac{1}{33}\lambda$.

The reduction in spot size allows for smaller marks to be made in the optical recording medium by the light beam. Smaller marks in the recording medium means that more marks will fit onto the surface of the recording medium. Thus, more data may be stored on conventional optical recording media using the optical systems and methods described herein. Similarly, more data may be read from optical recording media. For example, the amount of data stored on conventional optical media using the systems and methods described herein may be increased by a factor of about ten to about 100 and more. In one embodiment, a spot size of $\frac{1}{33}\lambda$ increases the amount of data that can be stored on conventional optical recording media by a factor of 1000.

In addition, the greater the resolution of the spot, the farther away the light device and superlens may be from the optical recording medium. That is, the light device may be physically located farther away from the optical recording medium if the light device creates a light beam having a smaller diameter. For example, in some embodiments, the light device and superlens of the systems and methods described herein may be placed 10's of $\lambda$ away from surface of the optical recording media, whereas conventional storage devices must be within 1$\lambda$ of the surface of optical recording media. Thus, the systems and methods described herein relax manufacturing tolerances making the optical devices described herein easier and less expensive to produce.

Figure 1:
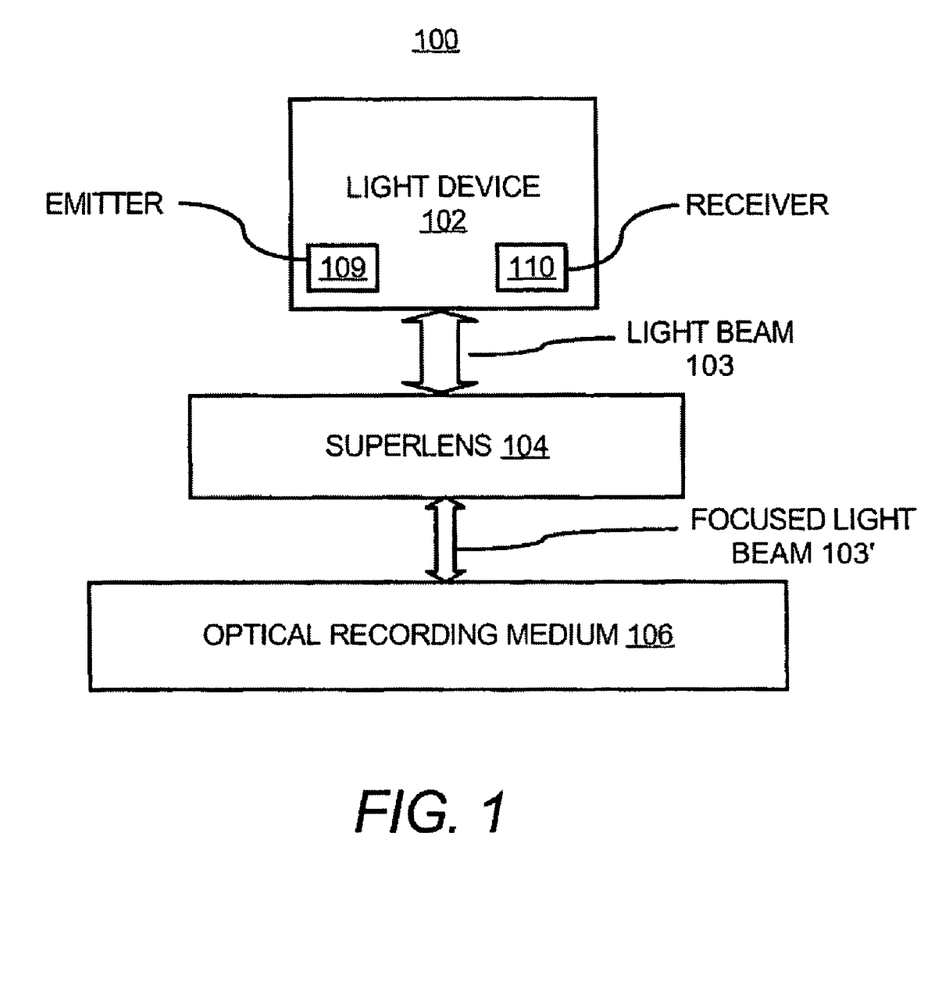
FIG. 1 illustrates an optical system, according to an embodiment.

With respect to FIG. 1, there is shown a simplified diagram of an optical system 100, according to an embodiment. It should be understood that the following description of the optical system 100 is but one manner of a variety of different manners in which such an optical system 100 may be configured. In addition, it should be understood that the optical system 100 may include additional elements, layers, and devices not shown in FIG. 1 and that some of the features described herein may be removed and/or modified without departing from a scope of the optical system 100.

The optical system 100 includes a light device 102, a superlens 104, and an optical recording medium 106. The light device 102 comprises an emitter 109, which is operable to emit a narrow light beam 103 to write data to the optical recording medium 106 and a receiver 110, which is operable to receive light that has been reflected off of the optical recording medium 106 in order to read data therefrom. The emitter 109 may include any device for creating a narrow beam of light, such as a laser, a tapered fiber, a near-field scanning optical microscope (NSOM), a quantum dot, or the like. Although only a single emitter 109 is depicted in FIG. 1, a person having ordinary skill in the art will appreciate that the light device 102 may include two or more emitters for creating two or more different beams of light. For instance, the light device 102 may include a second emitter (not shown), which is operable to produce a beam of light for reading data from the optical recording medium 106 that is weaker than the light beam 103 produced by the emitter 109.

The light beam 103 is focused by the superlens 104 and the resulting focused light beam 103' contacts the optical recording medium 106. The focused light beam 103' may make marks in the optical recording medium 106 to write data thereto. As mentioned above, the marks may be microscopic and/or nanoscopic depressions in the optical recording medium 106 or changes to a reflective property of the optical recording medium 106. The focused light beam 103' may also be reflected off of the optical recording medium 106 back to the receiver 110 to allow data to be read from the optical recording medium 106. The receiver 110, therefore, may include a photosensor and/or similar devices for receiving light. In one embodiment, the receiver 110 may include nanowire sensors, which are described in greater detail below. The light device 102 may also include multiple receivers. While the emitter 109 and the receiver 110 are depicted in FIG. 1 as separate units part of the same light device 102, a person having ordinary skill in the art will appreciate that the light device 102 may include two separate devices.

The superlens 104 is a device which focuses the light beam 103 produced by the light device 102 to subwavelength proportions. Therefore, the superlens 104 increases the resolution and reduces the spot size of the light beam 103 by creating the focused light beam 103'. The superlens 104 may include a first layer of material having a negative index of refraction or a first layer of material having either a negative permittivity or a negative permeability, such as silver, which has a negative permittivity. The first layer of the superlens 104 may be used in conjunction with a second layer composed of a dielectric material. However, a person having ordinary skill in the art will appreciate that any materials, which are capable of focusing light to subwavelength proportions, may be used to create the superlens 104.

In an embodiment, the superlens 104 may reduce the spot size created by the light beam 103 on the optical recording medium 106 to ½$\lambda$. For example, the light beam 103 may be a near ultraviolet light of about 380 nm. The superlens 104 may increase the resolution of the light beam 103 to create the focused light beam 103' having a diameter equal to or less than about 190 nm. In other embodiments, the spot size may be reduced to 30 nm or less in diameter or $\frac{1}{12}\lambda$. In further embodiment, the spot size may be reduced by the superlens 104 to $\frac{1}{33}\lambda$.

Figure 2:
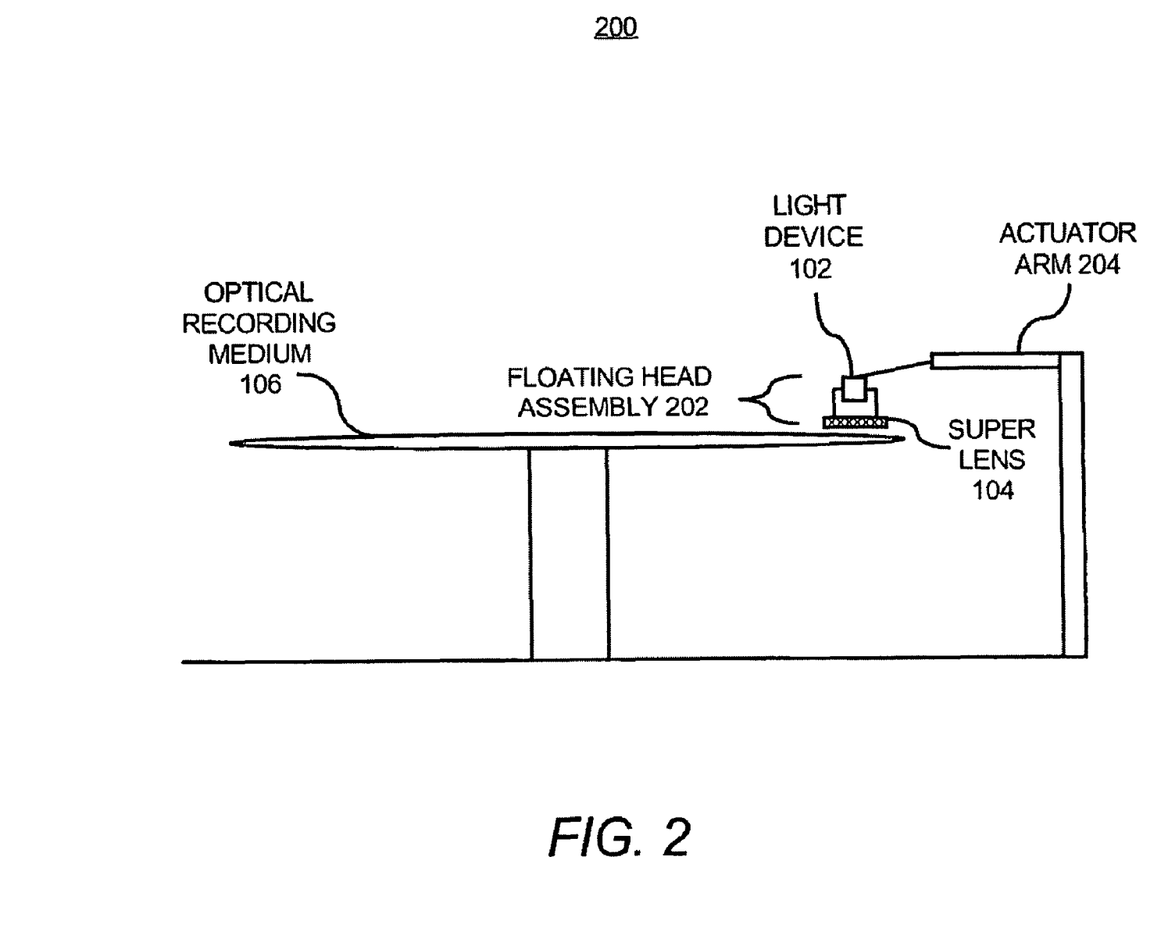
FIG. 2 illustrates a hard drive, according to an embodiment.

With respect to FIG. 2, there is shown a simplified diagram of an optical hard drive 200, according to an embodiment. It should be understood that the following description of the optical hard drive 200 is but one manner of a variety of different manners in which such an optical hard drive 200 may be configured. In addition, it should be understood that the optical hard drive 200 may include additional elements, layers, and devices not shown in FIG. 2 and that some of the features described herein may be removed and/or modified without departing from the embodiment of the optical hard drive 200 described herein.

The optical hard drive 200 includes the components of the optical system 100 including the light device 102, the superlens 104, and the optical recording medium 106, shown in FIG. 1. Although not shown in FIG. 2, the light source 102 may include at least one of the emitter 109 and the receiver 110, shown in FIG. 1. It should be understood that the optical hard drive 200 of FIG. 2 is shown merely as an illustrative example of one possible embodiment in which the optical system 100 may be used. As such, the optical system 100 may be used in differently designed devices for reading data from or writing data to different types of optical recording media.

The optical hard drive 200 includes the optical recording medium 106, such as a DVD, for example, spinning underneath of a floating head assembly 202. The floating head assembly 202 includes the light device 102 and the superlens 104, which are physically connected to each other. In this manner, the floating head assembly 202 may be moved across the optical recording medium 106 by an actuator arm 204, such that the light device 102 and the superlens 104 remain in a substantially fixed position relative to each other. This allows the focused light beam 103' to, in turn, move across the optical recording medium 106 to write data to different locations on the optical recording medium 106 or read data from different locations on the optical recording medium 106.

It should be understood that the optical system 100 and the optical hard drive 200 may include elements not specifically illustrated in FIG. 1 and FIG. 2, respectively. For example, either the optical system 100 and/or the optical hard drive 200 may include a beam splitter for reading data from the optical recording medium 106. Similarly, either the optical system 100 and/or the optical hard drive 200 may include additional light devices and/or superlenses arranged in an array. That is, either the optical system 100 and/or the optical hard drive 200 may include additional light devices and/or superlenses to simultaneously write data to or read data from the same optical recording medium 106 or multiple optical recording media.

Figure 3:
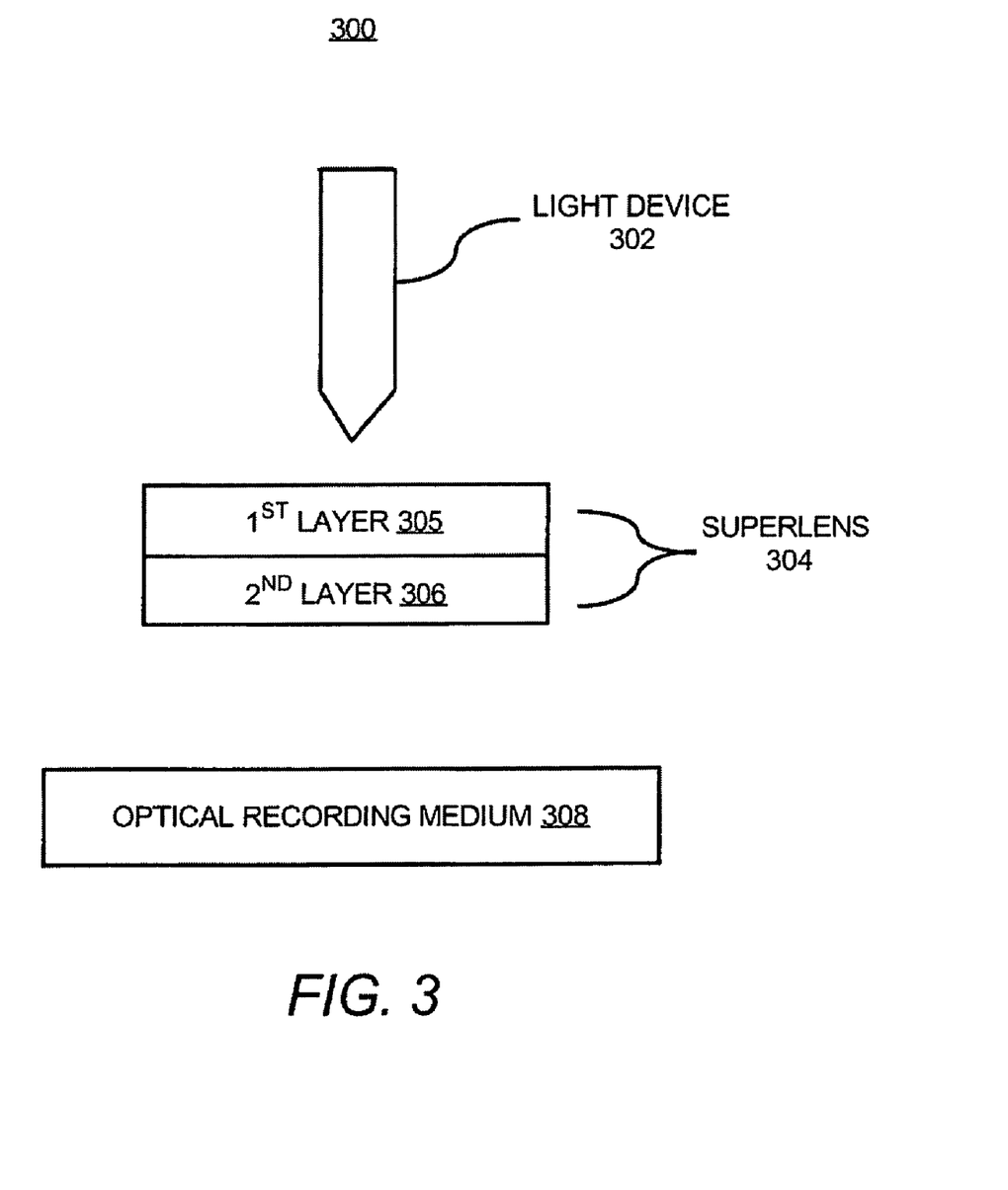
FIG. 3 illustrates an optical system, according to another embodiment.

With respect to FIG. 3, there is shown a simplified diagram of a optical system 300, according to another embodiment. It should be understood that the following description of the optical system 300 is but one manner of a variety of different manners in which such an optical system may be configured. In addition, it should be understood that the optical system 300 may include additional elements, layers, and devices not shown in FIG. 3 and that some of the features described herein may be removed and/or modified without departing from the embodiment of the optical system 300 described herein.

The optical system 300 includes a light device 302, a superlens 304, and an optical recording medium 308. The optical recording medium 308 may be substantially similar to the optical recording medium 100 described above with respect to FIGS. 1 and 2. The light device 302 is a tapered fiber for producing a narrow beam of light to write data to or read data from the optical recording medium 308. The superlens 304 includes a first layer 305 and a second layer 306. The first layer 305 may comprise a material having a negative index of refraction or a first layer of material having either a negative permittivity or a negative permeability, such as silver, which has a negative permittivity. The second layer 306 may comprise a dielectric material. However, a person having ordinary skill in the art will appreciate that the first and second layers 305 and 306 may comprise any reasonably suitable materials. Moreover, while the superlens 304 is depicted as having two layers, a person having ordinary skill in the art will appreciate that the superlens 304 may have any reasonably suitable number of layers.

The optical system 300 may operate in a manner similar to the optical system 100 described above with respect to FIG. 1. The light device 302 may emit a light beam, which is focused by the superlens 304 to create a focused beam of light. The focused beam of light may write data to the optical recording medium 308 or be reflected off of the optical recording medium 308 to read data therefrom. The optical system 300 may be used in a system substantially similar to the optical hard drive 200 shown in FIG. 2.

Figure 4A:
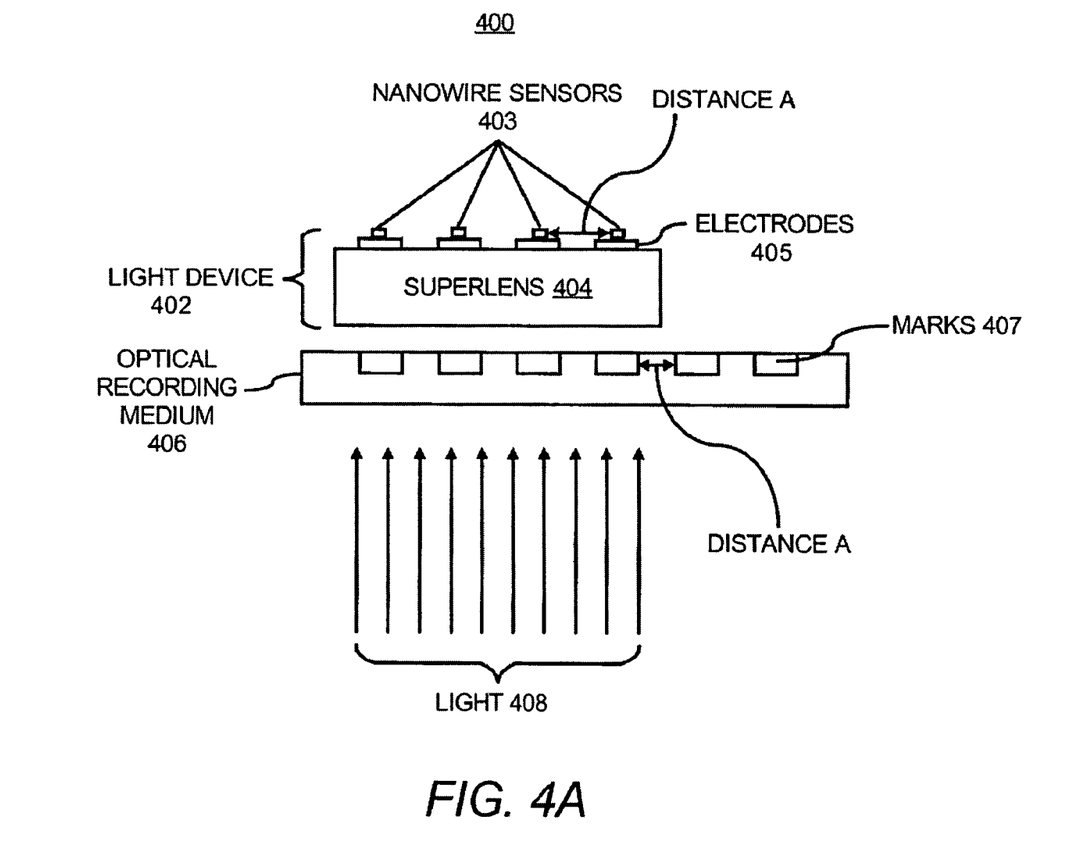
FIG. 4A illustrates a side view of an optical system, according to another embodiment.

With respect to FIG. 4A, there is shown a simplified diagram of a optical system 400, according to another embodiment. It should be understood that the following description of the optical system 400 is but one manner of a variety of different manners in which such an optical system may be configured. In addition, it should be understood that the optical system 400 may include additional elements, layers, and devices not shown in FIG. 4A and that some of the features described herein may be removed and/or modified without departing from the embodiment of the optical system 400 described herein.

The optical system 400 includes a light device 402, an optical recording medium 406, and light 408. The optical system 400 may be used to read data from the optical recording medium 406. The optical recording medium 406 may be substantially similar to the optical recording mediums described above with respect to FIGS. 1-3. However, the optical recording medium 406 contains marks 407, which represent data. The marks 407 may be formed by using the optical systems described above. Alternatively, or in addition thereto, the marks 407 may be formed by other processes known in the art. For example, the marks 407 may be formed by stamping, embossing, nanolithography, etc. In any event, the marks 407 represent data stored on the optical recording medium. The marks 407 are shown with a distance A between each of the marks 407.

The light 408 may be emitted by a light source (not shown) towards the optical recording medium 406. In one embodiment, the light 408 may be of a substantially uniform wavelength. For example, the light 408 may have a wavelength of 380 nm. However, a person having ordinary skill in the art will appreciate that the light 408 may be any reasonably suitable wavelength. Because the marks 407 alter the properties of the optical recording medium 406, the light 408 may pass through the optical recording medium 406 via the marks 407. The light passing through the marks 407 may contact the light device 402, which may detect the light 408 in order to read the data from the optical recording medium 406.

The light device 402 includes a superlens 404 and nanowire sensors 403 sitting upon electrodes 405. While four nanowire sensors 403 are shown in FIG. 4A, a person having ordinary skill in the art will appreciate that the optical system 400 may include any reasonably suitable number of nanowire sensors 403. The superlens 404 may be substantially similar to the superlens 104 and 304, described above with respect to FIGS. 1-3. Therefore, the superlens 404 may focus the light passed through the optical recording medium 406 via the marks 407. The nanowire sensors 403, in combination with the electrodes 405, may act as photoconductors and/or phototransistors to detect the light focused by the superlens 404. That is, a current may flow through the nanowire sensors 403. Photons from the light 408 passing through the optical recording medium 406 and focused by the superlens 404 may impinge on the nanowire sensors 403 and, thereby, alter the resistance of the nanowire sensors 403. This change in resistance may be detected to determine that portions of the light 408 passed through the marks 407.

Figure 4B:
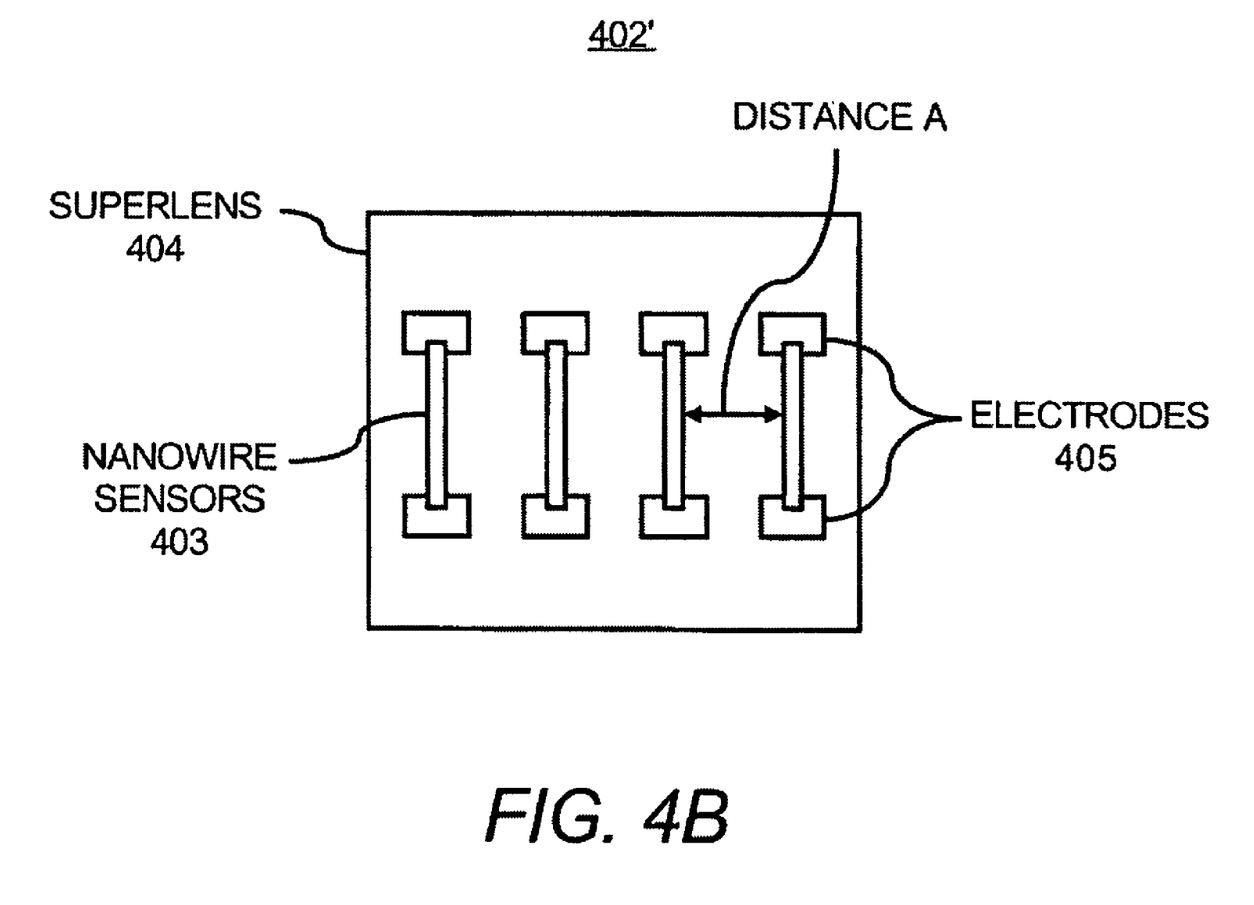
FIG. 4B illustrates a top view of a light device, according to an embodiment.

With respect to FIG. 4B, there is shown a simplified diagram of a top view of a light device 402', according to an embodiment. It should be understood that the following description of the light device 402' shown in FIG. 4B is but one manner of a variety of different manners in which such light device 402' may be configured. In addition, it should be understood that the light device 402' shown in FIG. 4B may include additional elements, layers, and devices not shown in FIG. 4B and that some of the features described herein may be removed and/or modified without departing from the embodiment of the light device 402' described herein.

The light device 402' may be a top view of the optical system 400 shown in FIG. 4A. Thus, the light device 402' includes the superlens 404 and the nanowire sensors 403 sitting on the electrodes 405. As FIGS. 4A and 4B show, the nanowire sensors 403 are separated by a distance A. Similarly, as set forth above, the marks 407 in the optical recording medium 406 are also separated by the distance A. That is, the distance between the nanowire sensors 403 may be substantially equal to the distance between the marks 407 in the optical recording medium 406. Therefore, each of the marks 407 may correspond to one of the nanowire sensors 403. In this manner, the light 408 passing through each mark 407 may impinge on a single nanowire sensor 403. However, in other embodiments, the distance between adjacent nanowire sensors 403 may be less than the distance between adjacent marks 407.

Figure 5:
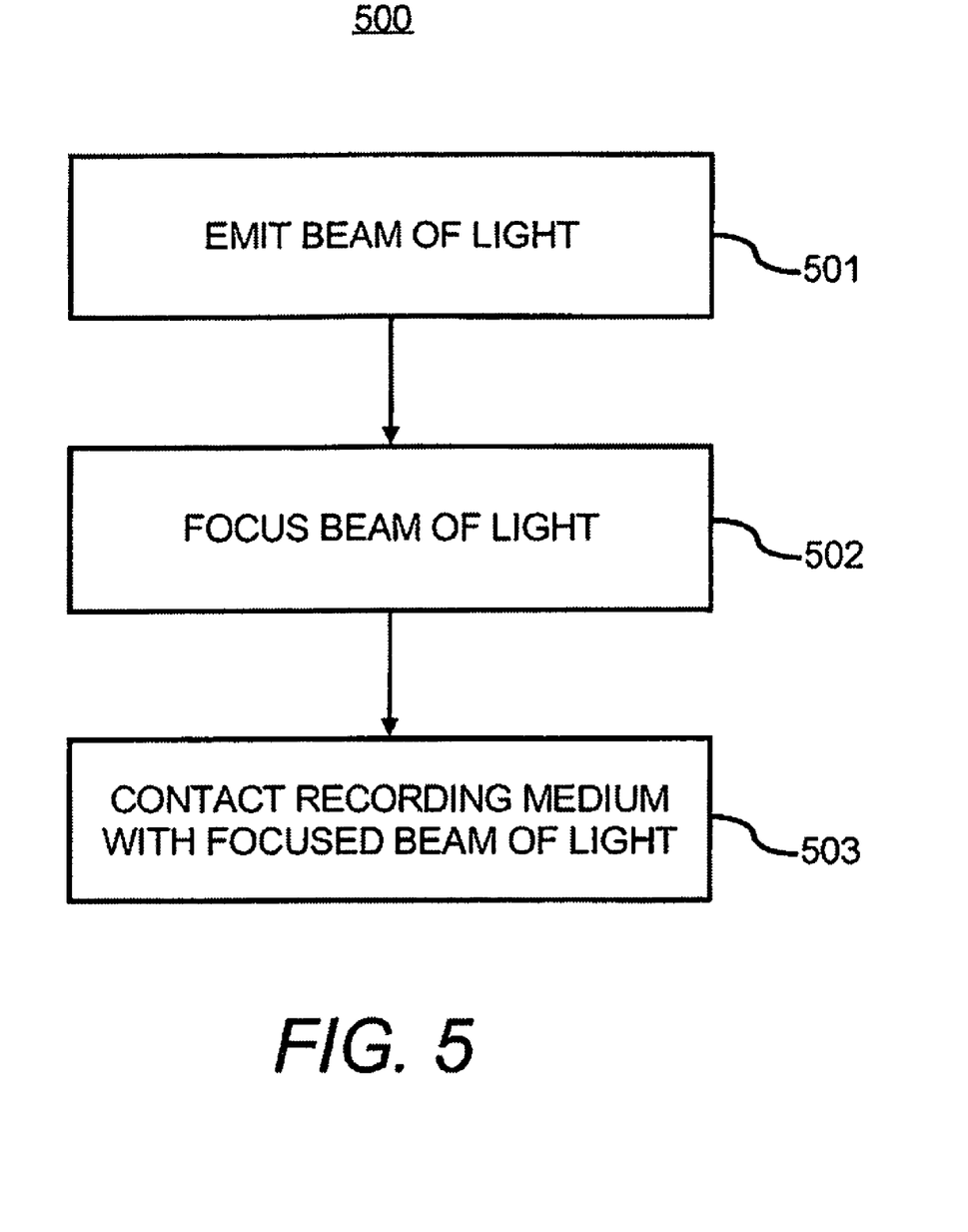
FIG. 5 illustrates a method for reading data from or writing data to an optical storage medium, according to an embodiment.

Turning now to FIG. 5, there is shown a flow diagram of a method 500 for reading data from and/or writing data to an optical storage medium, according to an embodiment. It is to be understood that the following description of the method 500 is but one manner of a variety of different manners in which an example of the invention may be practiced. It should also be apparent to those of ordinary skill in the art that the method 500 represents a generalized illustration and that other steps may be added or existing steps may be removed, modified or rearranged without departing from a scope of the method 500.

The method 500 may be initiated at step 501 where a light beam 103 is emitted. The light beam 103 may be emitted from the light device 102, described above with respect to FIG. 1 and FIG. 2 or the light device 302 of FIG. 3. The light beam 103 may be a narrow beam of light produced by a nanoscale laser, an NSOM tip, or the like.

At step 502, the light beam 103 emitted by the light device 102 is focused by a superlens 104 to create a focused light beam 103'. For example, the light beam 103 may be focused to subwavelength proportions, such as $½\lambda$, $1/12\lambda$, etc.

At step 503, the focused light beam 103' created by the superlens 104 contacts a recording medium, such as the optical recording medium 106 described above with respect to FIG. 1 and FIG. 2 to write data thereto or read data therefrom.

The systems and method described herein may increase the amount of data that can be stored on optical recording media by a factor of 10 to 100 and more. In one embodiment, a spot size of $1/33\lambda$ increases the amount of data that can be stored on conventional optical recording media by a factor of 1000. In addition, the greater the resolution of the focused light beam 103', the farther away the light device 102 and superlens 104 may be from the optical recording medium 106. In an example, the light device 102 and superlens 104 may be 10's of $\lambda$ or more away from the surface of the optical recording medium 106. This relaxes manufacturing tolerances making the optical devices described herein easier and less expensive to produce.

What has been described and illustrated herein are examples of the invention along with some of its variations. The terms, descriptions and figures used herein are set forth by way of illustration only and are not meant as limitations. Those skilled in the art will recognize that many variations are possible within the spirit and scope of the invention, which is intended to be defined by the following claims and their equivalents in which all terms are meant in their broadest reasonable sense unless otherwise indicated.

What is claimed is:

1. An optical system comprising:
   an optical recording medium, which is operable to store data;
   a light device configured to emit a beam of light to write the data to the optical recording medium or read the data from the optical recording medium; and
   a superlens positioned between the optical recording medium and the light device, wherein the superlens is configured to focus the beam of light emitted from the light device to create a focused beam of light having a resolution less than a wavelength of the light on the optical recording medium.

2. The optical system of claim 1, wherein the focused beam of light has a resolution equal to or less than about $½\lambda$.

3. The optical system of claim 1, wherein the distance between the superlens and the optical recording medium is equal to or greater than about $10\lambda$.

4. The optical system of claim 1, wherein the light device and the superlens are attached to each other.

5. The optical system of claim 1, further comprising:
   a second light device configured to facilitate parallel writing to or parallel reading from the optical recording medium.

6. An optical hard drive comprising:
   an optical recording medium, which is operable to store data; and
   a floating head assembly including
      a light device configured to emit a beam of light to write the data to the optical recording medium or read the data from the optical recording medium, and
      a superlens positioned between the optical recording medium and the light device, wherein the superlens is configured to focus the beam of light emitted from the light device to create a focused beam of light having a resolution less than a wavelength of the light on the optical recording medium.

7. The optical hard drive of claim 6, wherein the focused beam of light has a resolution equal to or less than about $½\lambda$.

8. The optical hard drive of claim 6, wherein the distance between the superlens and the optical recording medium is equal to or greater than about $10\lambda$.

9. The optical hard drive of claim 6, further comprising:
   an actuator arm configured to move the floating head assembly across a surface of the optical recording medium.

10. The optical hard drive of claim 6, further comprising:
    a second light device configured to facilitate parallel writing to or parallel reading from the optical recording medium.

11. A method comprising:
    emitting a beam of light from a light device;
    focusing the beam of light with a superlens to create a focused beam of light having a resolution less than a wavelength of the light; and
    contacting the focused beam of light onto an optical recording medium to write data to or read data from the optical recording medium.

12. The method of claim 11, wherein focusing the beam of light comprises focusing the beam of light to create a focused beam of light having a resolution equal to or less than about ½λ.

13. The method of claim 11, wherein contacting the focused beam of light onto the optical recording medium comprises forming marks in the optical recording medium to write data thereto.

14. The method of claim 11, further comprising:
reflecting the focused beam of light off of the optical recording medium to read data therefrom.

15. The method of claim 11, further comprising:
emitting a beam of light from a second light device to simultaneously read data from or write data to the optical recording medium.

16. The method of claim 11, further comprising:
emitting a beam of light from a second light device to simultaneously read data from or write data to the optical recording medium and a second optical recording medium.

17. An optical system for reading data from an optical recording medium comprising:
the optical recording medium, wherein the optical recording medium has a first surface and a second surface opposite to the first surface, wherein the first surface includes a plurality of marks representing the data;
a light source configured to emit light towards the second surface of the optical recording medium;
a light device configured to receive the light emitted from the light source that has passed through the optical recording medium via the marks, wherein the light device includes
a superlens operable to create a focused beam of light having a resolution less than a wavelength of the light and
at least one nanowire sensor.

18. The optical system of claim 17, wherein the marks in the optical recording medium have a predefined distance between each of the marks and the light device includes a plurality of nanowire sensors arranged in a substantially parallel configuration with a distance between each of the plurality of nanowire sensors substantially equal to or less than the predefined distance between each of the marks in the optical recording medium.

19. A method for reading data from an optical recording medium comprising:
receiving light which has passed through marks in the optical recording medium;
focusing the light with a superlens to create focused light; and
detecting the focused light with at least one nanowire sensor.

20. The method of claim 19, wherein detecting the focused light with at least one nanowire sensor includes detecting a change in the resistance of the at least one nanowire sensor due to the focused light impinging on the at least one nanowire sensor.

21. The method of claim 19, wherein detecting the focused light with at least one nanowire sensor includes detecting the focused light with a plurality of nanowire sensors and the method further comprises:
positioning the nanowire sensors in a substantially parallel configuration such that the distance between each of the plurality of nanowire sensors is substantially equal to or less than a distance between each of the marks in the optical recording medium.

* * * * *